US007729489B2

(12) United States Patent
Lee et al.

(10) Patent No.: US 7,729,489 B2
(45) Date of Patent: Jun. 1, 2010

(54) TRANSFERRING A COMMUNICATIONS EXCHANGE

(75) Inventors: David Cheng-Wei Lee, Sunnyvale, CA (US); Johnny Hsienchow Lee, San Gabriel, CA (US); Fadi Ramzi Jabbour, Sunnyvale, CA (US); Eric HengChih Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 11/403,475

(22) Filed: Apr. 12, 2006

(65) Prior Publication Data
US 2007/0263828 A1 Nov. 15, 2007

(51) Int. Cl.
*H04M 3/42* (2006.01)
(52) U.S. Cl. .............................. 379/212.01; 379/211.01; 379/212.02; 379/215.01; 379/201.1; 379/201.12; 455/462; 455/417; 455/428
(58) Field of Classification Search ................. 455/462, 455/417, 428, 410, 411; 379/212.01, 201.12, 379/211.01
See application file for complete search history.

(56) References Cited

U.S. PATENT DOCUMENTS

| | | | |
|---|---|---|---|
| 6,363,065 B1 | 3/2002 | Thornton et al. | |
| 6,614,781 B1 | 9/2003 | Elliott et al. | |
| 6,678,265 B1 | 1/2004 | Kung et al. | |
| 6,687,245 B2 | 2/2004 | Fangman et al. | |
| 6,725,044 B2 | 4/2004 | Verma et al. | |
| 6,823,188 B1 | 11/2004 | Stern | |
| 6,961,575 B2 | 11/2005 | Stanforth | |
| 7,031,275 B1 * | 4/2006 | Borella et al. ............... | 370/328 |
| 7,106,848 B1 * | 9/2006 | Barlow et al. ............ | 379/212.01 |
| 7,142,862 B2 * | 11/2006 | Halsell ........................ | 455/445 |
| 7,171,221 B1 * | 1/2007 | Amin et al. .................. | 455/462 |
| 7,242,923 B2 * | 7/2007 | Perera et al. ................. | 455/411 |
| 7,257,108 B2 | 8/2007 | Cheston et al. | |
| 7,403,744 B2 | 7/2008 | Bridgelall | |
| 2003/0119548 A1 | 6/2003 | Mohammed | |
| 2004/0062223 A1 | 4/2004 | Boyd et al. | |
| 2004/0081120 A1 | 4/2004 | Chaskar | |

(Continued)

OTHER PUBLICATIONS

International Searching Authority, International Search Report and Written Opinion, PCT/US07/66275, International Filing date Apr. 10, 2007, Mail date Jul. 18, 2008.

(Continued)

*Primary Examiner*—Curtis Kuntz
*Assistant Examiner*—Phung-Hoang J Nguyen
(74) *Attorney, Agent, or Firm*—Stolowitz Ford Cowger LLP

(57) ABSTRACT

Methods and systems for transferring a communications exchange using a mobile handset are described. A radio frequency (RF) signal is transmitted from a mobile handset to a base station to provide a communications exchange. The communications exchange exists between the mobile handset and a first communications device. The mobile handset automatically detects a second communications device when it is in close proximity to the second communications device. The second communications device is capable of receiving a call handoff. If the mobile handset is in close proximity to the second communications device, then a transfer request including information associated with the second communications device is received from the second communications device. The transfer request is accepted and the communications exchange is seamlessly transferred to the second communications device form the mobile handset.

20 Claims, 7 Drawing Sheets

U.S. PATENT DOCUMENTS

2004/0203788 A1  10/2004  Fors et al.
2006/0121894 A1  6/2006  Ganesan
2006/0121916 A1  6/2006  Aborn et al.
2008/0026787 A1  1/2008  Ibrahim et al.

OTHER PUBLICATIONS

USPTO, PCT International Search Report and Written Opinion; PCT/US2007/079095, filing date Sep. 20, 2007, mail date Jul. 23, 2008.

* cited by examiner

TRANSFERRING A COMMUNICATIONS EXCHANGE

TECHNICAL FIELD

Embodiments of the present invention pertain to a method of transferring a communications exchange.

BACKGROUND

For a variety of reasons, a user may want to transfer a communications exchange, such as a phone call, from one communications device to another. For example, a user talking on a cellular phone may be experiencing less than optimal reception and suffering from poor voice quality. In this scenario, the user may wish to transfer the phone call to a landline phone to improve the voice quality of the conversation. In a different example, a user talking on a landline phone may find it convenient on some occasions to be able to transfer the conversation to a cellular or wireless phone so he or she does not have to be restricted by the physical location of the landline phone.

However, transference of a communication exchange faces several difficulties. For example, conventionally, if a user wants to transfer a communications exchange he or she has to either end the current communications exchange and start a new communications exchange or place the current communications exchange on hold, initiate a consult transfer call to the phone intended for the transfer, and manually answer it to complete the transfer.

Unfortunately, both ending the current communications exchange and placing the current communications exchange on hold causes an undesirable disruption to the natural flow of the communications exchange. Ending the current communication exchange and initiating a new communications exchange is inconvenient and may even be irritating to users. In the business context, significant interruptions to conversations may lead to lost sales. Similarly, placing the current communications exchange on hold and manually performing the series of steps required to finally make the communications exchange transfer is troublesome.

DETAILED DESCRIPTION OF THE DRAWINGS

Figure 1A:
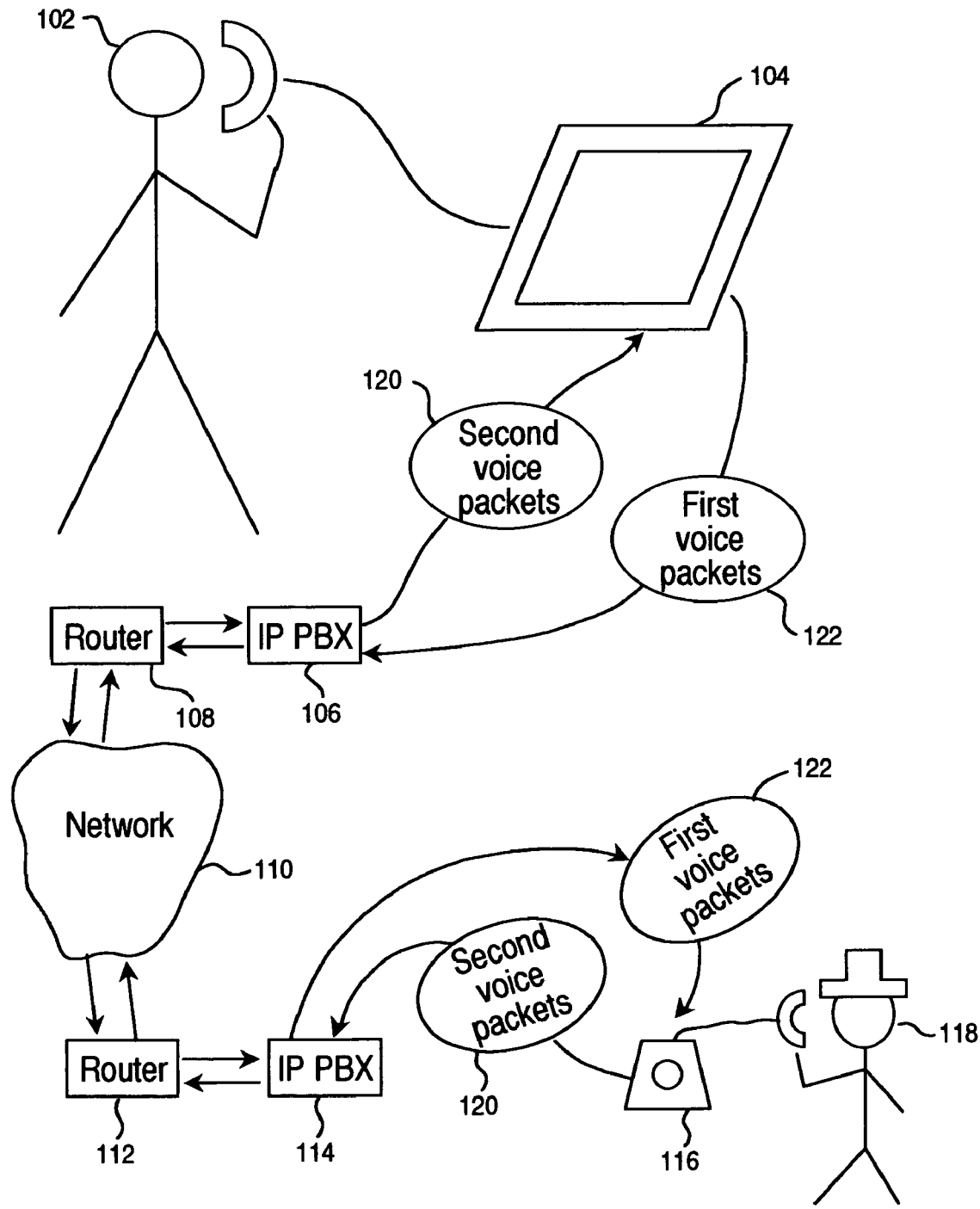
FIGS. 1A-1D illustrate exemplary systems for transferring a communications exchange.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention can be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

In general, transference of a communications exchange (e.g., a phone call) from one communications device to another communications device often leads to a noticeable interruption in the communications exchange and encounters other challenges that make the transference cumbersome. Frequently, the transference of a communications exchange from one communications device to another is met with either a temporary interruption with the communications exchange or a complete disruption that requires terminations of the current communications exchange and initiation of a new communication exchange.

Distinct from traditional approaches to transference of communications exchanges, embodiments pertain to methods and systems for seamlessly transferring a communications exchange (e.g., a phone call) using a mobile handset (e.g., a cellular phone).

In one embodiment, a radio frequency (RF) signal (e.g., cellular phone signal) is transmitted from a mobile handset (e.g., a cellular phone) to a base station (e.g., a cellular phone tower) to provide a communications exchange (e.g., a phone call). The communications exchange exists between the mobile handset and a first communications device (e.g., a regular landline phone). The mobile handset automatically detects a second communications device (e.g., an Internet Protocol phone) when it is in close proximity to the second communications device. The second communications device is capable of receiving a call handoff from the mobile handset. If the mobile handset is in close proximity to the second communications device, then a transfer request including information associated with the second communications device (e.g., phone number of the second communications device) is received from the second communications device. The transfer request is accepted and the communications exchange is seamlessly transferred to the second communications device form the mobile handset.

In one example, a user talking on a cellular phone may not have adequate reception and suffers from poor voice quality. The cellular phone is communicating with a distant landline phone and the user wishes to improve the voice quality of the conversation. In the present example, the user places the cellular phone in close proximity to a regular desktop phone capable of receiving a call handoff from the cellular phone. The regular desktop phone, in this example, is pre-configured by the user to recognize the cellular phone and pre-authorized to forward a transfer request to the cellular phone. Once placed in close proximity of the regular desktop phone, the regular desktop phone automatically detects the existence of the cellular phone and forwards a transfer request to the cellular phone. The user accepts the transfer request, and the call is transferred from between the cellular phone and the distant landline phone to between the regular desktop phone and the distant landline phone. In one instance, the transfer request is accepted by the cellular phone automatically and does not require the user to manually accept. Further, in one instance, the transfer is seamlessly completed without interruptions to the call. The user does not have to first place the communication exchange on hold or end the original call and initiate a new call. Beneficially, in the present example, a user can seamlessly and automatically transfer a phone call from one communications device, such as a cellular phone, to another communications device, such as a regular phone, without noticeably interrupting the conversation.

FIGS. 1A-1D illustrate exemplary systems for transferring a communications exchange. FIG. 1A includes user 102, Internet Protocol (IP) phone 104, Internet Protocol Private Branch Exchange (IP-PBX) 106, router 108, network 110, router 112, IP-PBX 114, IP phone 116, user 118, first voice packets 122, and second voice packets 120. IP phone 104 is coupled with IP-PBX 106; IP-PBX 106 is coupled with router 108, which in turn is coupled with network 110. Similarly, IP phone 116 is coupled with IP-PBX 114; IP-PBX 114 is coupled with router 112, which in turn in coupled with network 110. Voice packets, including but not limited to, first voice packet 122 and second voice packet 120 are capable of being forwarded from IP phone 104 to IP phone 116 and vice versa. Also, it is understood that network 110 can be implemented in different ways. For example, network 110 can be but is not limited to a Wide Area Network (WAN), a Local Area Network, and/or other types of compatible networks.

While the present embodiment is described in the context of IP phones, embodiments are not limited to IP phones and can be implemented on cellular phones, regular landline phones that utilize traditional Private Branch Exchange, wireless phones, and/or other types of capable communications devices.

Furthermore, although FIG. 1A is shown and described as having certain numbers and types of elements, other embodiments are not necessarily limited to the exemplary implementation. That is, other embodiments can include elements other than those shown, and can include more than one of the elements that are shown. For example, other embodiments can include a greater or fewer number of routers than the two routers (routers 108 and 112) shown.

With reference to FIG. 1A, user 102 is communicating with user 118 by sending and receiving a number of voice packets via network 110. In the present embodiment, first voice packets 122 are forwarded from IP phone 104 towards IP phone 116. Also, second voice packets 120 are forwarded from IP phone 116 towards IP phone 104. In one instance, user 102 may desire to transfer the conversation to a mobile handset (e.g., cellular or wireless phone) so he or she does not have to be restricted by the physical location of the IP phone 104.

Figure 1B:
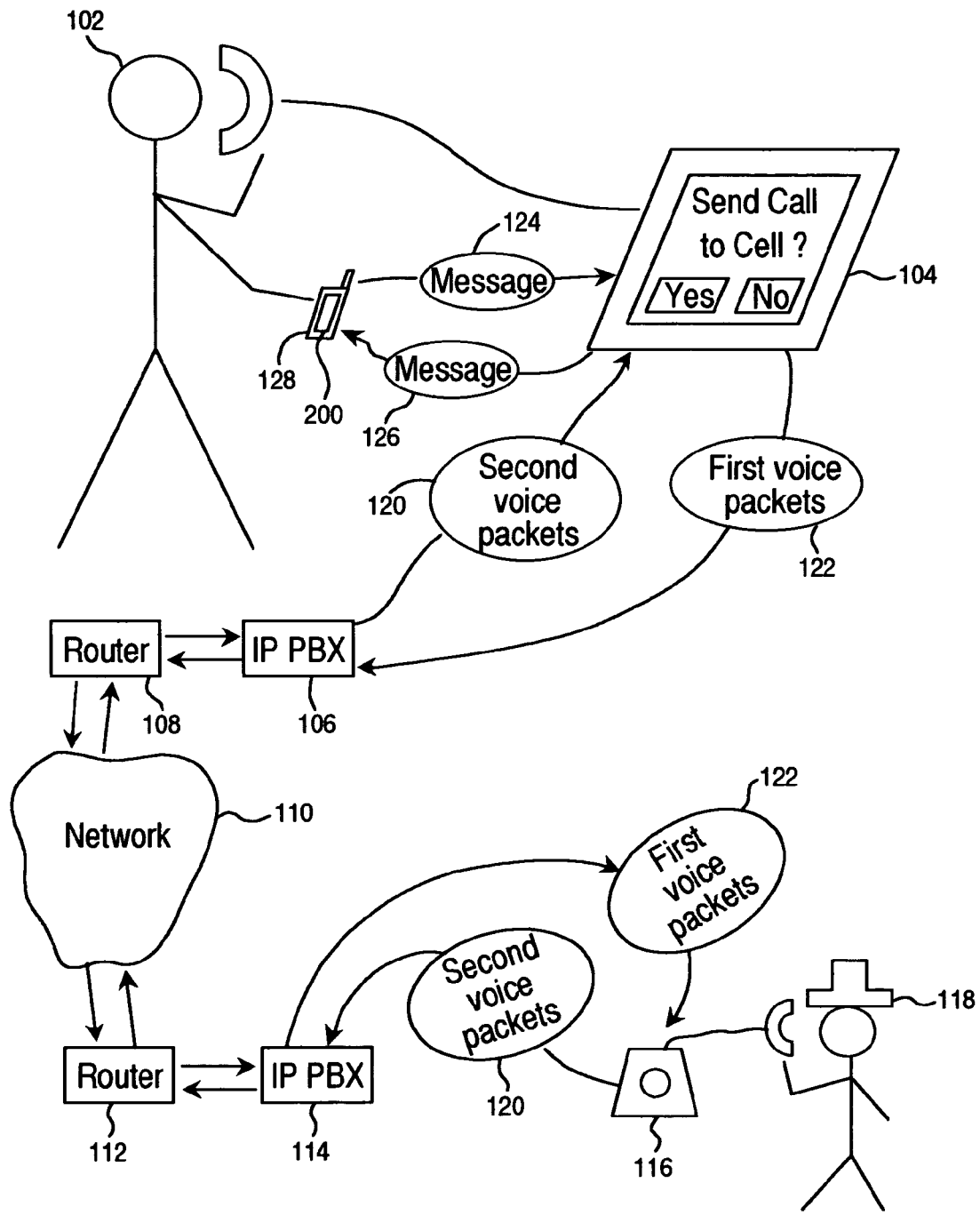

With reference to FIG. 1B, user 102 introduces mobile handset 128 (not shown in FIG. 1A), and places the mobile handset 128 in close proximity to IP phone 104. Mobile handset 128 is capable of receiving a call handoff from IP phone 104 and can be a cellular phone, a wireless phone, and/or other types of mobile phones. The mobile handset, in one embodiment, includes system 200 (illustrated in FIG. 2) for transferring a voice communications exchange.

Figure 2:
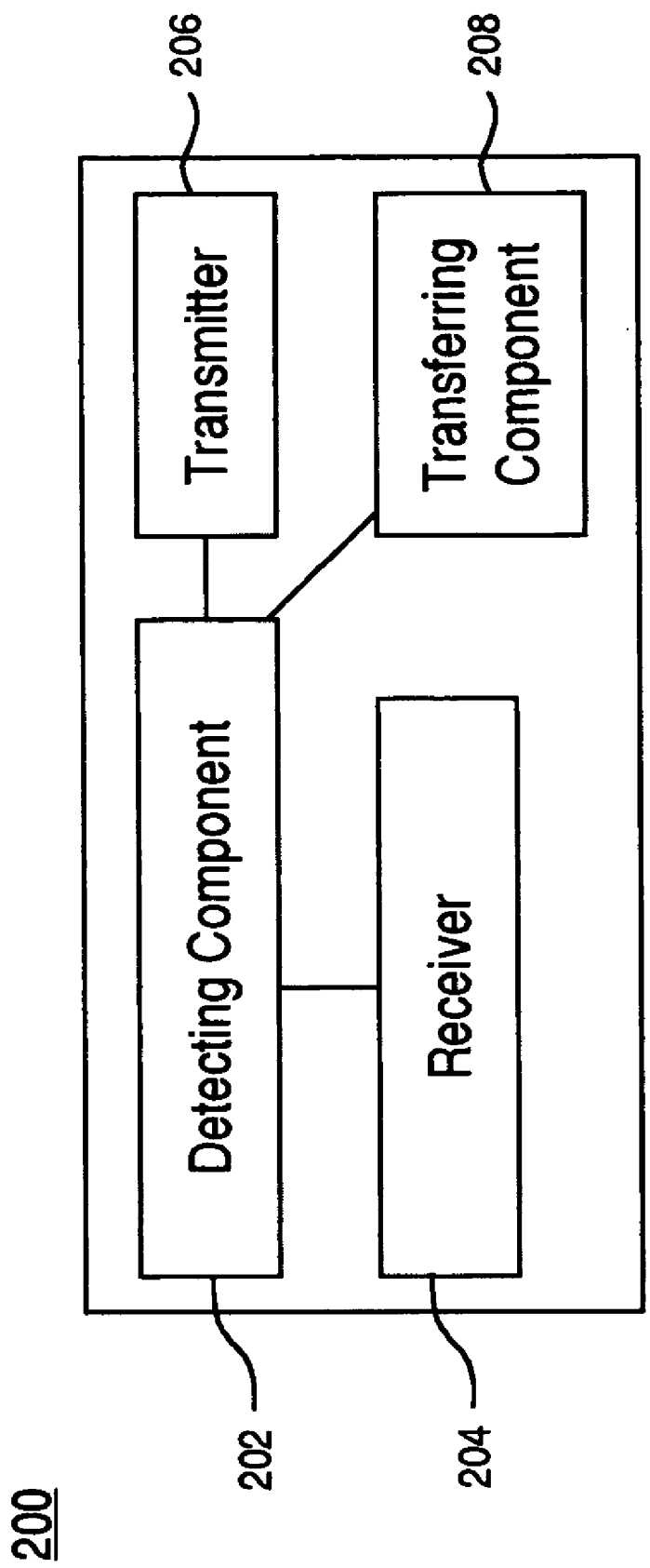
FIG. 2 illustrates block diagrams of a voice communications exchange transfer system for transferring voice communications exchanges, upon which embodiments can be implemented.

Referring now to FIG. 2, block diagrams of a voice communications exchange transfer system 200 for transferring voice communications exchanges are illustrated, upon which embodiments can be implemented. System 200, in one embodiment, includes a detecting component 202 for detecting a proximate communications device (e.g., a cellular phone and/or an IP phone), a transmitter 206, a receiver 204, and a transferring component 208 for seamlessly transferring the voice communications exchange. The receiver 204, transferring component 208, and transmitter 206 are coupled with detecting component 202. Although voice communications exchange transfer system 200 is shown and described as having certain numbers and types of elements, the embodiments are not necessarily limited to the exemplary implementation. That is, voice communications exchange transfer system 200 can include elements other than those shown, and can include more than one of the elements that are shown. For example, voice communications exchange transfer system 200 can include a greater or fewer number of detecting components than the one detecting component (detecting component 202) shown.

In one embodiment, detecting component 202 detects a proximate communications device (e.g., a wireless phone, an IP phone, and/or a cellular phone). Detecting component 202 can be implemented by utilizing infrared light, wireless USB, Bluetooth, and/or other sensor technologies to detect a proximate communications device. In the present embodiment, upon detection of a proximate communications device (e.g., a wireless phone, an IP phone, and/or a cellular phone), the receiver 204 can be utilized to receive a transfer request and voice communications exchange from the proximate communications device. Further, transmitter 206 can be utilized to transfer an acceptance of the transfer request and voice communications exchange to the proximate communications device. In one embodiment, the acceptance of the transfer request is preconfigured to be automatic upon detection of the proximate communication device, therefore enabling, in one example, a communications exchange to be automatically transferred without user input. In addition, a transferring component can be utilized to seamlessly transfer the voice communications exchange to the proximate communications device (e.g., a regular phone). The transferring component can be implemented in a variety of ways. In one example, the transferring component is a processor. Further, in one embodiment, seamlessly transferring is performed without having to first end the voice communications exchange and without having to first place the voice communications exchange on hold while initiating a call handoff before completing the seamlessly transferring.

In the present embodiment, IP phone 104 is equipped with a sensor (e.g., infrared light sensor, wireless USB sensor, and/or Bluetooth sensor) capable of automatically detecting mobile handset 128. Similarly, mobile handset 128 is also equipped with a sensor capable of automatically detecting IP phone 104.

Upon determining that the mobile handset 128 is in close proximity to IP phone 104, a message 124 (e.g., transfer request) is forwarded from IP phone 104 to mobile handset 128. Also, in the present embodiment, a display on IP phone 104 displays a text message inquiring the user 102 whether he or she would be interested in transferring the call from IP phone 104 to mobile handset 128 (e.g., wireless phone). In addition, upon determining that the IP phone 104 is in close proximity to mobile handset 128, a message 126 (e.g., transfer request) is forwarded from mobile handset to IP phone 104. However, in the present embodiment, a message is automatically ignored unless the recipient device has the call. Consequently, message 126 is automatically ignored by mobile handset 124.

Figure 1C:
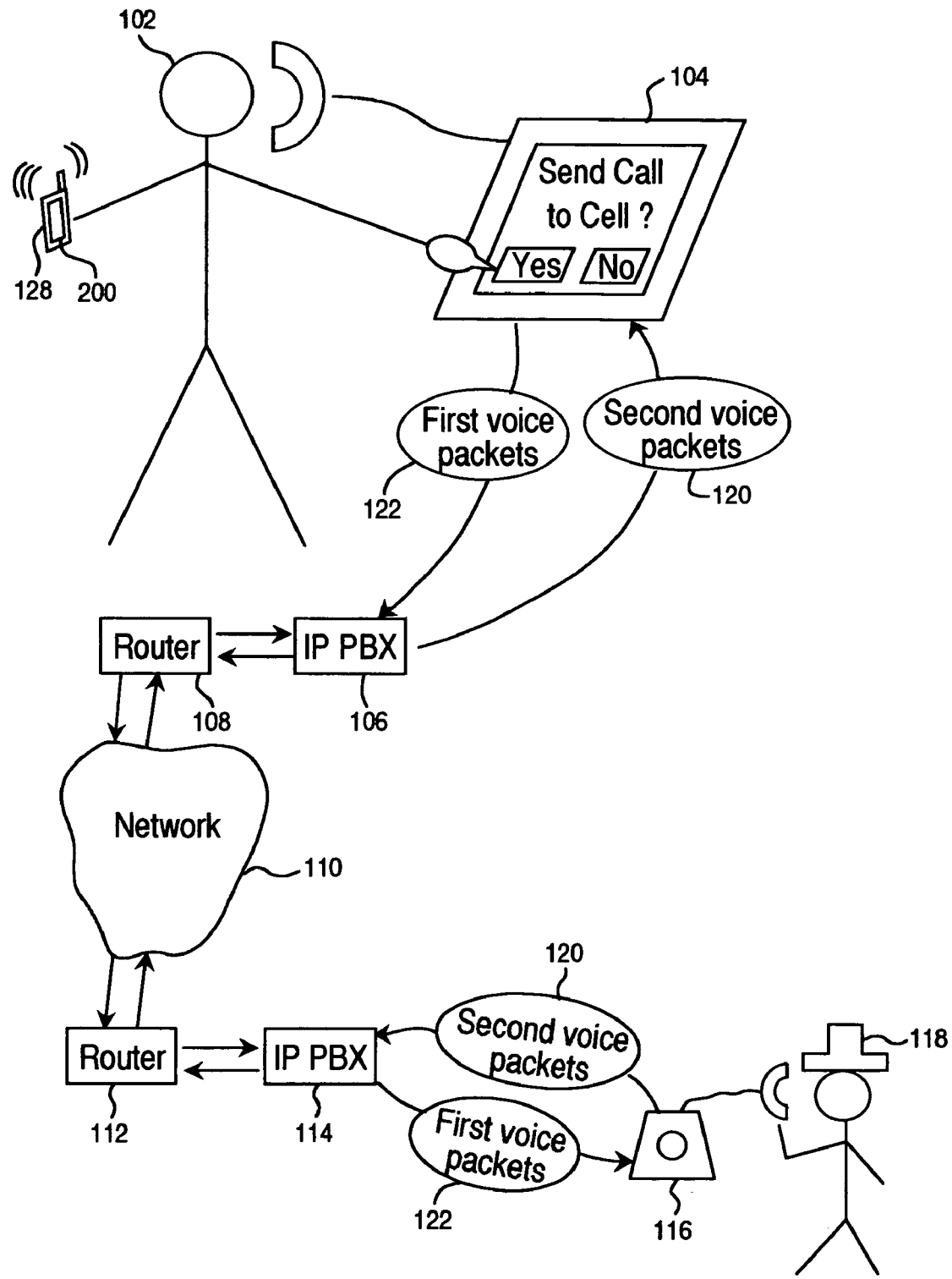

Referring now to FIG. 1C, user 102 accepts the transfer request and mobile handset 128, in one example, may generate an audio indication (e.g., ringing), a visual indication (e.g., flashing), and/or a motion based indication (e.g., vibrating) to inform user 102. In one embodiment, the transfer is automatic and user 102 does not need to provide additional input to mobile handset 128 to confirm the transfer. In another embodiment, user 102 can press a button on the mobile handset, such as "talk", to complete the transfer from IP phone 104 to mobile handset 128.

Figure 1D:
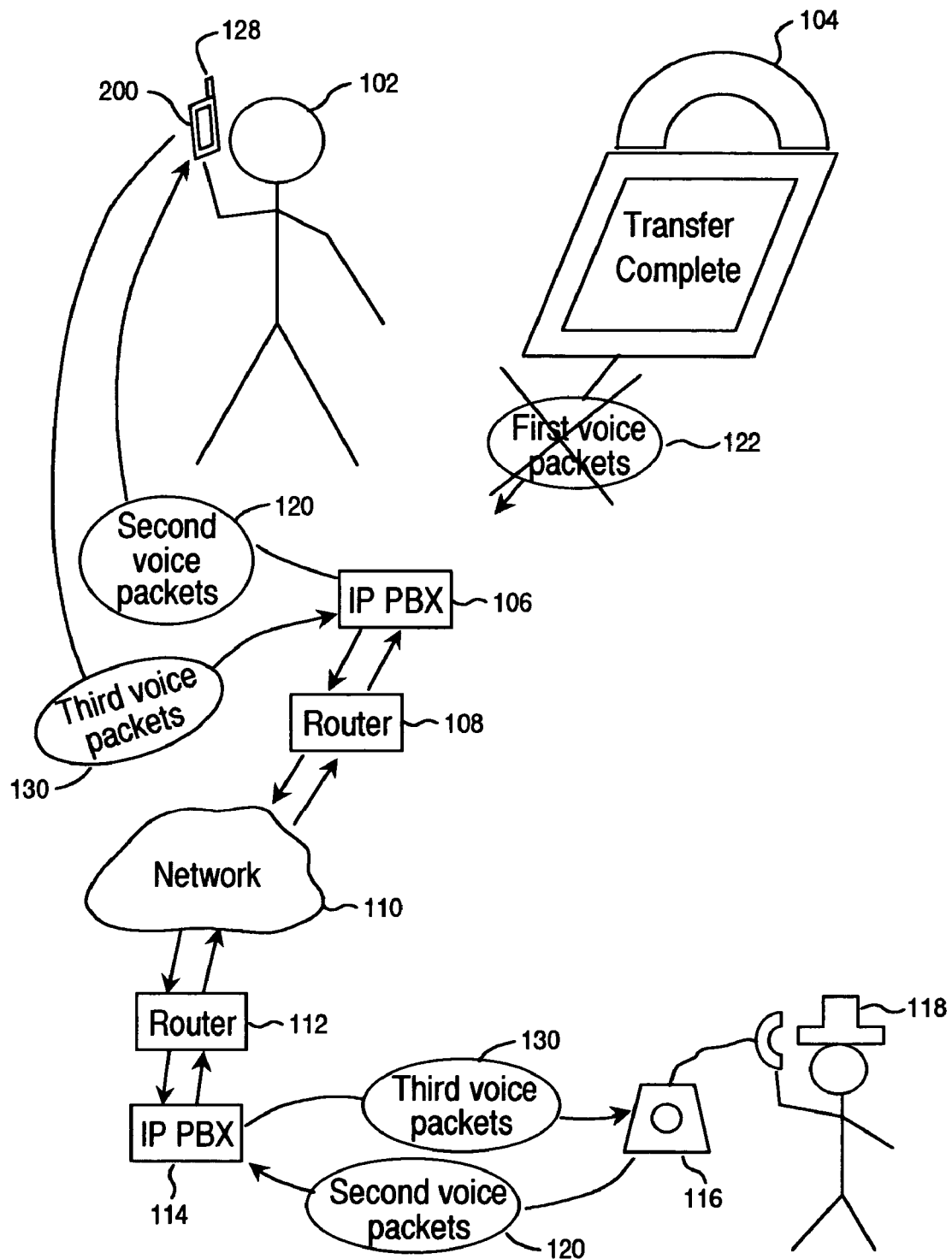

With reference to FIG. 1D, in the present embodiment, upon completion of the transfer from IP phone 104 to mobile handset 128, first voice packets 122 are no longer forwarded from IP phone 104 towards IP phone 116. In other embodiments, first voice packets 122 may be continued to be forwarded towards IP phone 116 and second voice packets may be continued to be forwarded towards IP phone 104, thus allowing user 102 the option of talking to user 118 using either IP phone 104 or mobile handset 128.

Once the call is transferred, user 102 utilizes mobile handset 128 to communicate with user 118. Third voice packets 130 are forwarded from mobile handset 128 towards IP phone 116. Second voice packets 120 are forwarded from IP phone 116 towards mobile handset 128. In the present embodiment, the transference is performed seamlessly without interruption to the call. In one example, user 102 can simply begin talking on mobile handset 128 and put down IP phone 104 at the same time. The call is not placed on hold and, as a result, user 118 may not detect the transference from IP phone 104 to mobile handset 128.

Embodiments can be useful to individuals as well as organizations and/or businesses. For an individual, embodiments, in one example, provide a convenient and user friendly way of accomplishing a call transfer. Conventional methods of transferring, such as placing a call on hold and then performing a series of other steps, may serve as a barrier to many users. For example, a child or an elderly person may find a conventional method overly complex and confusing and as a result, be deterred for utilizing a transferring function. In the business context, although professionally trained personnel may be able to perform a conventional method of transferring without much trouble, still, placing a customer on hold or even worse, terminating and initiating a new call to the customer to complete a transfer may be an undesirable form of conducting business. For example, a customer placed on hold may often just simply hang up, which translates into lost profits. Therefore, by allowing a communications exchange, such as a call transfer, to be performed simply and seamlessly, both individuals and businesses can benefit.

One embodiment introduces the idea of transferring a call to another nearby device on another line. Users will be able to transfer a call from or to their cell phone simply by placing the cell phone in close proximity to the phone from which they're transferring the call to or from. A sample scenario follows:

User Bob is on a call in his office.

He needs to make it back home by 5:00 or else the kids will finish off dinner, leaving him with nothing.

He does not want to end the current conversation as it is work-related and important. He also does not want to interrupt the flow of conversation by asking the other party to call him back on his cell phone.

Bob places the phone next to his office phone, gets a suggestion on his office phone to send the call to his cell phone, and accepts the suggestion.

The call begins to ring on his cell phone and is immediately and seamlessly transferred to his cell phone without the other party noticing what happened (unless the voice quality on Bob's cell phone is noticeably worse than that on his office phone).

Bob answers the call on his cell phone and the consult transfer is then completed.

Bob continues the conversation without the other party noticing what happened (unless the voice quality on Bob's cell phone is noticeably worse than that on his office phone).

Another embodiment occurs when the user decides to transfer a call from his cell phone to a landline. A sample scenario follows:

Bob gets a call on his cell phone from his wife while in his office.

He does not get good reception in the office and therefore decides to switch the call to his home line.

He places the cell phone near his office phone, gets a suggestion on his cell phone to send the call to his office phone, and accepts the suggestion.

The call begins to ring on his office phone. The call is immediately and seamlessly transferred to his office phone.

Bob answers the call on his office phone and the consult transfer is then completed.

Bob continues the conversation without the other party noticing what happened.

One embodiment in which the method by which one phone recognizes close proximity to another is through the use of infrared light as many computers do today. For example, one phone could send the other phone its number or request the number of the other phone using RCS code, a commonly used standard protocol for infrared data communication. Another option would be to use Bluetooth to request/respond and exchange numbers between the phones. The recipient phone would then perform a true transfer of the call to the phone number it received.

In the embodiments described, various types of endpoints may be used; however, it makes most sense to provide this capability in phones that can easily be physically moved, such as cell phones or Cisco's wireless phones. In addition, various types of call handoff may also be used. In one embodiment, consult transfer is the method of choice.

The protocol used between the two endpoints may be subject to change, but the basic communication can be summarized with the following embodiment of a simple exchange:

Phone 1 has the call.

Phone 1 and phone 2 are placed physically next to each other.

Each phone sends a message to the other phone indicating that they are in close proximity and proposing a transfer. This message also contains the phone number of the phone sending the message.

When a phone receives such a message and is not on a call, the message is ignored. When a phone receives such a message and is on a call, then the user sees a message on his phone proposing a transfer to the nearby phone. In this case, phone 2 ignores phone 1's proposal but phone 1 shows the user the transfer proposal to phone 2.

The user on phone 1 can either ignore the proposal by doing nothing (it will go away in a matter of seconds) or accept it.

If the user accepts, a consult call is placed from phone 1 to phone 2. Phone 1 uses phone 2's number passed along in the message as the number to dial for the transfer. The original call on phone 1 remains as the active call, allowing the user to continue his conversation.

As the user's phone 2 rings, the user answers the call and the consult transfer is then immediately completed. In essence, the conversation moves from phone 1 to phone 2 as soon as phone 2 is answered and not when the consult call is initially placed.

In an embodiment, if the two phones are associated with each other and the user chooses a configuration that always accepts such transfer proposals, then the user's permission is not required for the transfer to be performed. Instead, as soon as the user places the phones near each other the transfer is performed.

Figure 3:
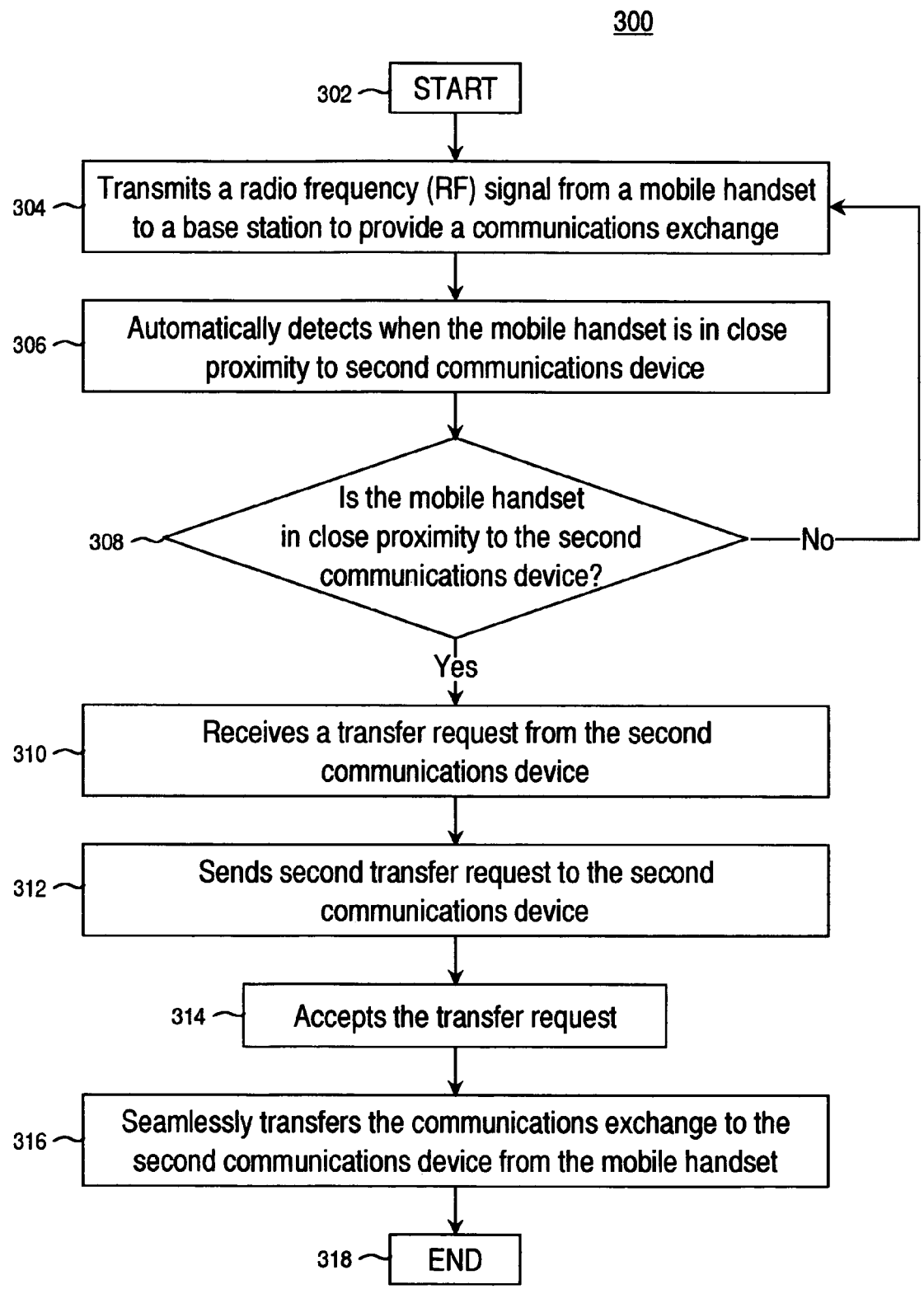
FIG. 3 illustrates an exemplary method for transferring a communications exchange.

FIG. 3 illustrates an exemplary method for transferring a communications exchange. Although specific steps are disclosed in flowchart 300, such steps are exemplary. That is, embodiments are well suited to performing various other or additional steps or variations of the steps recited in flowchart 300. The steps in flowchart 300 can be performed in an order different than presented.

At block 302, the process starts.

At block 304, a radio frequency (RF) signal from a mobile handset is transmitted to a base station (e.g., cellular phone tower) to provide a communications exchange (e.g., a phone call between a cellular phone and a regular home phone). The communications exchange exists between the mobile handset and a first communications device. The first communication device can be but is not limited to a mobile handset, a telephone, and/or an Internet Protocol (IP) phone. Further, in one embodiment, the communications exchange is a call.

At block 306, the mobile handset automatically detects when it is in close proximity to a second communications device, in which the second communications device is capable of receiving a call handoff. Automatic detections of the second communication device can be implemented in a variety of ways. In one embodiment, automatic detection of the second communications device utilizes infrared light. In another embodiment, automatic detection of the second communications device utilizes wireless USB. In still another embodiment, automatic detection of the second communications device utilizes Bluetooth. Further, in yet another embodiment, the second communications device is an Internet Protocol capable device (e.g., an IP phone).

At block 308, it is determined whether the mobile handset is in close proximity to the second communications device. If it is determined that the mobile handset (e.g., a cellular phone) is in close proximity to the second communications device (e.g., an IP phone), then in one example, a transfer request from the second communications device is received. If it is determined that the mobile handset (e.g., a cellular phone) is not in close proximity to the second communications device (e.g., an IP phone), then in one example, the mobile handset (e.g., a cellular phone) continues to transmit a radio frequency (RF) signal to a base station to sustain the communications exchange with the first communication device (e.g., a regular phone).

At block 310, a transfer request from the second communications device is received. The transfer request comprises information associated with the second communications device. In one embodiment, the information includes designation information such as the phone number of the phone sending the transfer request. In another embodiment, the information includes other types of information corresponding to the phone sending the transfer request.

At block 312, second transfer request is sent to the second communications device. The second transfer request includes information (e.g., cellular phone number) associated with the mobile handset (e.g., cellular phone). The information includes a designation of the second communications device and can be but is not limited to the phone number of the phone sending the transfer request. The designation can also be a unique ID associated with the phone sending the transfer request. Also, in one embodiment, if the second communications device is not on a communications exchange, then the second transfer request is automatically ignored by the second communications device.

At block 314, the transfer request is accepted. In one embodiment, the acceptance of a transfer request is preconfigured to be automatic upon detection of the second communications device and does not require user input. For example, a user can choose a configuration setting that always accepts transfers. Hence, with this setting, a transfer is performed as the user places the mobile handset in close proximity to the second communications device. In another embodiment, acceptance of a transfer request is performed by a user manually.

At block 316, the communications exchange is seamlessly transferred to the second communications device from the mobile handset. Traditionally, transferring a communication exchange from a first communications device to a second communications device has several disadvantages. Under conventional approaches, the user either has to end the communications exchange to a first communications device before initiating a call handoff to the second communications device or has to place the communications exchange to the first communications device on hold while initiating a call handoff to the second communications device. Consequently, the communications exchange transfer is not seamless and frequently results in a disruption to the communications exchange.

In contrast to conventional approaches, embodiments enables one to seamlessly transfer without having to first end the communications exchange and without having to first place the communications exchange on hold while initiating a call handoff before completing the seamlessly transferring. Advantageously, embodiments allow a user to transfer a communications exchange (e.g., a call) without causing disruption to a conversation.

Moreover, the transferring of the communications exchange can be implemented by utilizing a consult transfer, a call park, and/or a call conference. Further, transferring of the communication exchange can be implemented with different protocols, including but not limited to, Session Initiation Protocol and/or H.323 protocol.

At block 318, the process ends.

Figure 4:
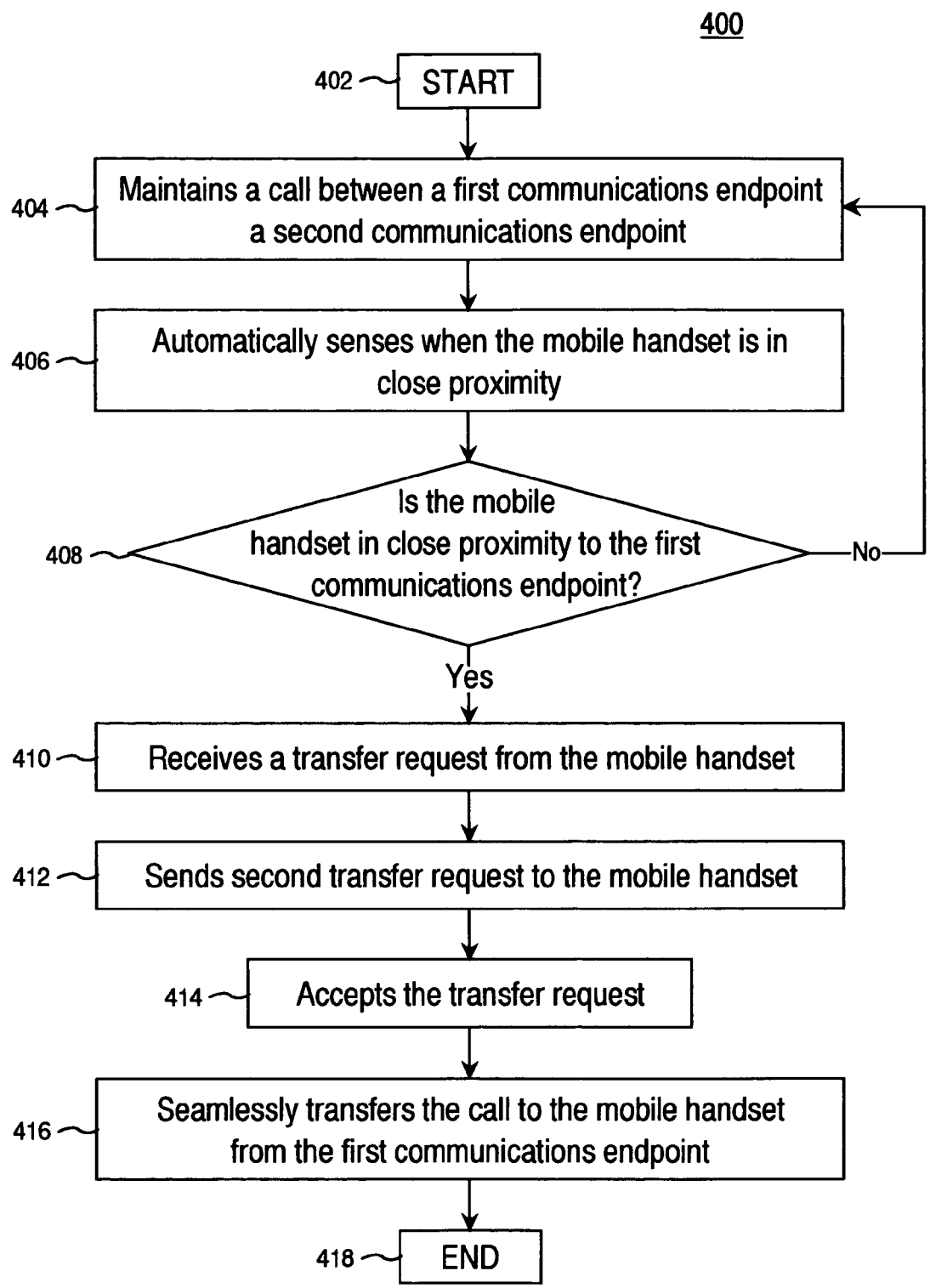
FIG. 4 illustrates another exemplary method for transferring a communications exchange.

FIG. 4 illustrates another exemplary method for transferring a communications exchange. Although specific steps are disclosed in flowchart 400, such steps are exemplary. That is, embodiments are well suited to performing various other or additional steps or variations of the steps recited in flowchart 400. The steps in flowchart 400 can be performed in an order different than presented.

At block 402, the process starts.

At block 404, a call is maintained between a first communications endpoint (e.g., a first communications device) a second communications endpoint (e.g., a second communications device). In one embodiment, the call is maintained via a public switched telephone network (PSTN). In another embodiment, the call is maintained via an Internet Protocol (IP) network. The first and second communications endpoint can be but are not limited to a cellular phone, a wireless phone, an IP phone, and/or a regular phone.

At block 406, a mobile handset capable of receiving a call handoff is automatically sensed when the mobile handset is in close proximity. In one embodiment, the mobile handset is a mobile phone (e.g., cellular and/or wireless phone). The automatic sensing of the mobile handset can be implemented by utilizing infrared light, wireless Universal Serial Bus (USB), and/or Bluetooth.

At block 408, it is determined whether the mobile handset is in close proximity to the first communications endpoint. If it is determined that the mobile handset (e.g., a cellular phone) is in close proximity to the first communications endpoint, then in one example, a transfer request including mobile handset information is received from the mobile handset. If it is determined that the mobile handset (e.g., a cellular phone) is not in close proximity to the first communications endpoint, then in one example, the call between the first communications endpoint and the second communications endpoint is maintained.

At block 410, a transfer request including mobile handset information is received from the mobile handset. The transfer request comprises information associated with the mobile handset. In one embodiment, the information includes the phone number of the mobile handset sending the transfer request.

At block 412, second transfer request is sent to the mobile handset. The second transfer request includes information (e.g., cellular phone number) associated with the first communications endpoint (e.g., cellular phone). The information includes a designation of the first communications end point and can but is not limited to the phone number of the first communications endpoint sending the transfer request. The designation can also be a unique ID associated with the first communications endpoint sending the transfer request. Also, in one embodiment, if the mobile handset is not on a call, then the second transfer request is automatically ignored by the mobile handset.

At block 414, the transfer request is accepted. In one embodiment, a user can pre-configure the setting of the first communications endpoint such that acceptance of the transfer request is automatic and does not need further user confirmation. In one example, as soon as a transfer request is received from the mobile handset, the first communications endpoint accepts the transfer automatically.

At block 416, the call is seamlessly transferred to the mobile handset from the first communications endpoint. In one embodiment, the call between the first communications endpoint and the second communications endpoint is seamlessly transferred to be maintained between the mobile handset and the second communications endpoint without any voice disruptions.

At block 418, the process ends.

To summarize, embodiments allow a communications exchange, such as a phone call, to be seamlessly transferred. Advantageously, embodiments can save time for users because, in one example, a communications exchange is automatically transferred without requiring a user to perform a list of cumbersome steps or procedures. More importantly, embodiments enable a communications exchange transfer to be made without disruption to the communications exchange. For businesses, fewer disruptions associated with communications exchanges transfers can lead to more satisfied customers and have a positive financial impact on the business.

In the foregoing specification, embodiments of the invention have been described with reference to numerous specific details that can vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for transferring a call comprising:
   engaging in an active call;
   receiving at a transferor communication device a call transfer request from the transferee communications device to initiate a call transfer, the call transfer request comprising call transfer information, wherein the transferee or transferor communications device is: a landline telephone, cellular telephone, wireless telephone or Voice-over-Internet protocol (VoIP) telephone, or combinations thereof;
   wherein the transferee communications device is not engaged in the active call at a time of sending the transfer request and wherein the transferee communications device sends the transfer request responsive to detecting a physical proximity of the transferor communications device;
   responsive to the transfer request, transferring the active call to the transferee communications device while maintaining the active call uninterrupted by completing the call transfer without first ending the active call on the transferor communications device or placing the active call on hold prior to transferring the active call to the transferee communications device;
   wherein the transferring the active call is independent of intervention of a network switch to initiate the active call transfer;
   wherein if the call is not currently active then ignoring the call transfer request from the transferee communications device;
   completing the active call transfer connecting the call on the transfer call and disengaging the active call on the transferor communications device after the transfer call is connected.

2. The method of claim 1, further comprising exchanging voice or image data, or combinations thereof during the active call.

3. The method of claim 1, wherein the active call is transferred using Session Initiation Protocol (SIP).

4. A method comprising:
   detecting a proximity of a communications device wherein the communications device is a landline telephone, cellular telephone, wireless telephone or Voice-over-Internet protocol (VoIP) telephone, or combinations thereof;
   communicating a transfer request to the communications device based on the detected proximity wherein the transfer request comprises call transfer information and wherein the communicating the transfer request is independent of whether the communications device is currently engaged in a call;

transferring an active call from the communications device responsive to both the transfer request and the communications device engaging in the active call;

maintaining the active call uninterrupted during the active call transfer by executing the active call transfer without placing the active call on hold or ending the active call prior to transferring the active call while contemporaneously engaging a transfer call to initiate the active call transfer from the communications device based on the call transfer information;

wherein the transferring the active call is independent of intervention of a network switch to initiate the active call transfer;

completing the active call transfer by disengaging the active call on the communications device after the transfer call is connected; and connecting the active call on the transfer call.

5. The method of claim 4, further comprising exchanging voice or image data, or combinations thereof during the active call.

6. The method of claim 4, wherein the active call is transferred using Session Initiation Protocol (SIP).

7. The method of claim 4, wherein the transfer request is communicated using Bluetooth protocol, wireless Universal Serial Bus (USB) or infrared data communications, or combinations thereof.

8. The method of claim 4, wherein detecting the proximity of the communications device comprises using one or more infrared signals.

9. A system for transferring a call comprising:
a first communications device comprising a detecting unit configured to automatically detect a second communications device within a threshold distance of the first communications device;

the first communications device further comprising a transmitter configured to transmit a call transfer request to the second communications device comprising call transfer information responsive to the detecting the second communications device, wherein the first communications device is configured to transmit the transfer request independent of whether the second communications device is currently engaged in a call;

the second communications device further comprising one or more logic blocks collectively configured to:
  accept the transfer request responsive to the second communication device currently engaging in an active call;
  communicate a consult call to the first communications device using the transfer information received from the first communications device to transfer the active call, while maintaining the active call without interrupting the active call on the second communications device during the consult call by communicating the consult call without placing the active call on hold or ending the active call prior to transferring the active call, wherein the transferring the active call is independent of intervention of a network switch to initiate the active call transfer; and the first communications device further configured to complete the transfer of the active call by accepting the consult call prior to the second communications device disengaging from the active call;

wherein the first and second communications devices comprise any of: a landline telephone, cellular telephone, wireless telephone or Voice-over-Internet protocol (VoIP) telephone, or combinations thereof.

10. The system of claim 9, wherein the logic units are further configured to accept the transfer request in response to an input.

11. The system of claim 9, wherein the transfer request is communicated using Bluetooth protocol, wireless Universal Serial Bus (USB) or infrared data communications, or combinations thereof.

12. The system of claim 9, wherein the detecting unit detects the distance between the first communications device and the second communications device using one or more infrared signals.

13. The system of claim 9, wherein the active call is transferred using Session Initiation Protocol (SIP).

14. A first communications device comprising:
a detector configured to automatically detect a second communications device within a particular close proximity wherein the second communications device comprises a landline telephone, cellular telephone, wireless telephone or Voice-over-Internet protocol (VoIP) telephone, or combinations thereof;

a transmitter configured to communicate a call transfer request upon detecting the second communications device and if the first communications device is not currently engaged in a call, the call transfer request sent independently of intervention of a network switch to initiate a call transfer, the call transfer request comprising call transfer information for the second communications device to transfer an ongoing call from the second communications device to the first communications device, wherein the transmitter is further configured to communicate the transfer request independent of whether the second communications device is currently engaged in a call; and one or more logic blocks configured to:
  automatically accept the call transfer of the ongoing call without first interrupting the ongoing call on the second communications device by placing the ongoing call on hold or ending the ongoing call prior to transferring the ongoing call; and
  complete the ongoing call transfer by connecting the call transfer of the ongoing call on the first communications device and disengaging the ongoing call on the second communications device after connecting the call transfer of the ongoing call on the first communications device.

15. The apparatus of claim 14, further comprising a landline telephone, cellular telephone, wireless telephone or Voice-over-Internet protocol (VoIP) telephone, or combinations thereof.

16. The first communications device of claim 14, wherein the call transfer request is communicated using Bluetooth protocol, wireless Universal Serial Bus (USB) or infrared data communications, or combinations thereof.

17. The first communications device of claim 14, wherein the detector is configured to use one or more infrared signals to detect the proximity to the communications device.

18. A local communications device comprising:
a receiver configured to receive a call transfer request from a remote communications device wherein the remote communications device is within a predetermine close proximity of the local communications device, wherein the call transfer request comprises information for transferring the call;

one or more logic blocks configured to;
  determine if a call is currently in progress on the local communications device; and automatically accept the call transfer request responsive to detecting the call in progress, wherein if a call is not currently in progress on the local communications device then ignoring the call transfer request from the transferee communications device; and a call transferring component configured to initiate the call transfer to the remote communications device using the information for transferring the call to transfer the call in progress to the remote communications device while maintaining the call in progress during the call transfer without placing the call in progress on hold or ending the call in progress prior to transferring the call in progress;

wherein the call transferring component is configured to transfer the call in progress independent of intervention of a network switch to initiate the transfer of the call in progress;

wherein the call transferring component is further configured to complete the transfer of the call in progress by connecting the call in progress on the remote communications device prior to disengaging the call in progress on the local communications device;

wherein the local communications device comprises: a landline telephone, cellular telephone, wireless telephone or Voice-over-Internet protocol (VoIP) telephone, or combinations thereof.

19. The local communications device of claim 18, wherein the call transfer request is communicated using Bluetooth protocol, wireless Universal Serial Bus (USB) or infrared data communications, or combinations thereof.

20. The local communications device of claim 18, wherein the local call in progress is transferred using Session Initiation Protocol (SIP).

* * * * *

UNITED STATES PATENT AND TRADEMARK OFFICE
CERTIFICATE OF CORRECTION

| | |
|---|---|
| PATENT NO. | : 7,729,489 B2 |
| APPLICATION NO. | : 11/403475 |
| DATED | : June 1, 2010 |
| INVENTOR(S) | : Lee et al. |

It is certified that error appears in the above-identified patent and that said Letters Patent is hereby corrected as shown below:

At column 11, line 46, please replace "communication" with --communications--.
At column 12, line 47, please replace "apparatus" with --first communications device--.
At column 14, line 15, please replace "the local call" with --the call--.

Signed and Sealed this
Third Day of May, 2011

David J. Kappos
*Director of the United States Patent and Trademark Office*